MULTIPATH COMMUNICATION SYSTEM UTILIZING REDUNDANT MESH NETWORK WITH MEANS AUTOMATICALLY DISCONNECTING FAULTY BRANCHES

Filed July 24, 1961 3 Sheets-Sheet 1

INVENTORS
E. DEAN BORDER
ROBERT A. PFENNING
BY John F. Fawler
ATTORNEY

Dec. 22, 1964 E. D. BORDER ETAL 3,162,827

MULTIPATH COMMUNICATION SYSTEM UTILIZING REDUNDANT MESH NETWORK WITH MEANS AUTOMATICALLY DISCONNECTING FAULTY BRANCHES

Filed July 24, 1961 3 Sheets-Sheet 2

INVENTORS
E. DEAN BORDER
ROBERT A. PFENNING
BY John F. Fawler
ATTORNEY

MULTIPATH COMMUNICATION SYSTEM UTILIZING REDUNDANT MESH NETWORK WITH MEANS AUTOMATICALLY DISCONNECTING FAULTY BRANCHES

Filed July 24, 1961 3 Sheets-Sheet 3

*INVENTORS*
E. DEAN BORDER
ROBERT A. PFENNING

BY John F Fawler
ATTORNEY 3,162,827

MULTIPATH COMMUNICATION SYSTEM UTILIZING REDUNDANT MESH NETWORK WITH MEANS AUTOMATICALLY DISCONNECTING FAULTY BRANCHES

Elmer Dean Border, Salinas, and Robert A. Pfenning, Pebble Beach, Calif., assignors, by mesne assignments, to Straza Industries, Inc., El Cajon, Calif., a corporation of California Filed July 24, 1961, Ser. No. 126,185
2 Claims. (Cl. 333—2)

This invention relates to communications systems, and more particularly to unit communications systems for installations where vulnerability to damage of parts of the system or the need for reliability in data transmission and reception, or both, are high. Examples of such an installation are naval warships, large aircraft, military command stations, missile launching sites and the like. The following discussion will be directed toward the use of the invention in a warship, such as an aircraft carrier, as one example of such installations.

The size and complexity of modern warships has increased the vulnerability of the intraship communications system to disabling damage during combat. The necessity of maintaining communications during such emergencies makes it imperative that the system shall function even if part of the interconnecting cabling or wiring is damaged or destroyed. This invention is directed toward achieving this general objective.

In accordance with the invention, a communications system utilizing a unique interconnecting network of transmission lines is established as the means of transferring any type of information, voice, command or data between two or more stations. The network consists of a series of essentially parallel transmission paths between any two stations. These paths are interconnected at widely scattered points throughout the system. The probability of simultaneously disabling all of these several paths becomes remote even when fire, explosion or other damage inflicting event occurs in the installation, and as long as any one of the paths remains intact, normal communications between undamaged stations are possible. Means for indicating otherwise undiscernible damage to the various sub-paths linking the junction points is provided to facilitate rapid detection and repair of that damage.

An object of the invention is the provision of a closed communications system with means for insuring transmission between remote stations in event of substantial damage to or destruction of major portions of the interconnecting transmission line.

A further object is the provision of a unique multipath transmission network with positive disconnect means for removing a disabled line from the network and for identifying that line.

The accomplishment of these and other objects of the invention will become apparent from the following description of a preferred embodiment thereof reference being had to the accompanying drawings in which.

The invention may be practiced with different types of communications system transmitting audio, vedeo or radio-frequency signals, and by way of example, an embodiment of the invention is described herein as a radio frequency carrier system.

Figure 1:
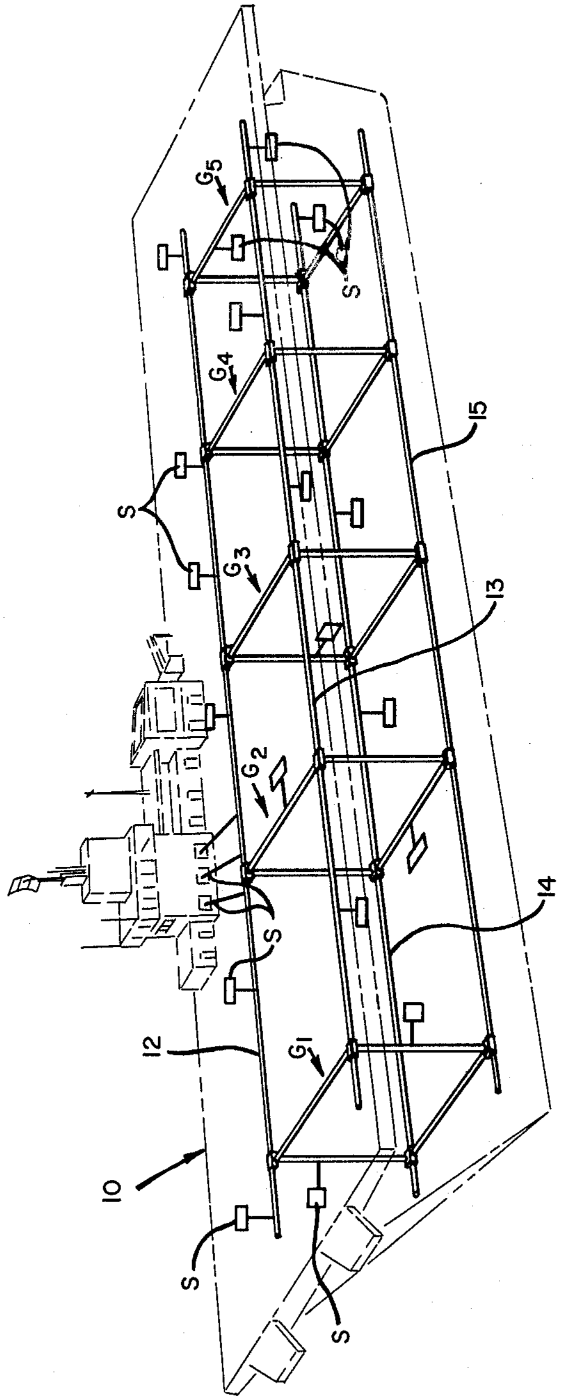
FIGURE 1 is a simplified diagram of the cable arrangement of this invention shown as part of a communications system on an aircraft carrier.

Referring now to the drawings, FIGURE 1 shows a communications system in an aircraft carrier 10 as an example of a naval warship requiring multistation intraship communications and which is vulnerable to damage or partial destruction during combat. The extremely simple diagram indicates a number of individual transmission and receiving stations S located throughout the ship. Each station is connected to a multicable transmission system comprising four longitudinal lines 12, 13, 14 and 15 extending generally parallel to the longitudinal axis of the ship and several transverse cable groups $G_1$, $G_2$, $G_3$, $G_4$ and $G_5$ consisting of lateral and vertical lines which interconnect the longitudinal lines at spaced intervals throughout the length of the ship. The lateral and vertical lines of each cable group are connected by T junctions to the longitudinal lines.

A radio frequency communications system including transmitter, receiver, and automatic selective call apparatus which may be used with this transmission network is described in a copending application of E. Dean Border and Robert A. Pfenning, Ser. No. 192,580, filed May 4, 1962, and entitled Communications System.

Each station S in the system includes a transmitter, a receiver and automatic selective call apparatus by which other stations on the ship may be called and automatically tuned to the transmitter frequency in order that normal communications between calling and called stations may be carried on. The multicable network shown in FIGURE 1 would, for such a system, transmit voice modulated carrier frequencies, and for this purpose each of the lines in the network comprises shielded coaxial cable.

Figure 2:
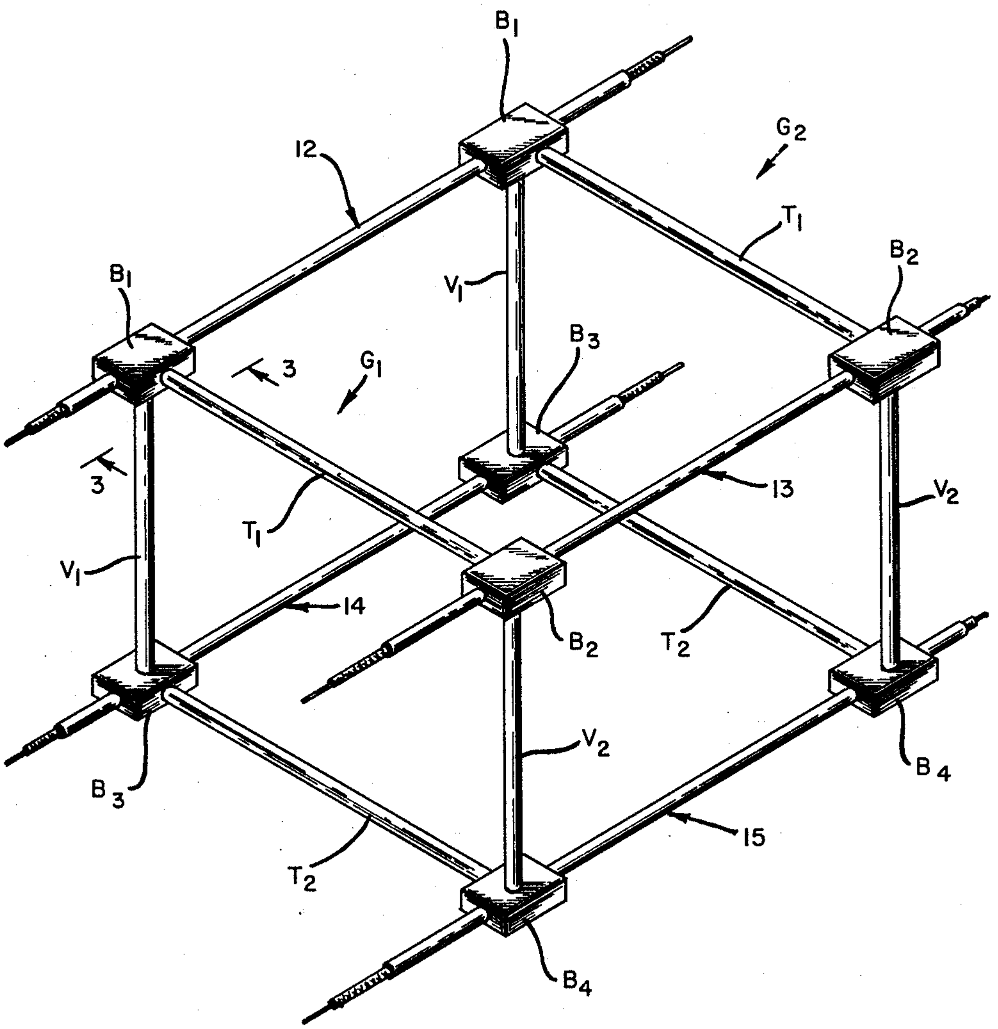
FIGURE 2 is a simplified diagram of coaxial lines and junction boxes comprising the transmission network.

Each transverse group of cables consists of upper and lower transverse lines $T_1$ and $T_2$ (see FIGURE 2) and vertical lines $V_1$ and $V_2$. The ends of these lines are joined to junction blocks $B_1$, $B_2$, $B_3$ and $B_4$ in which a T connection is made between each of the transverse lines and one of the longitudinal lines 12, 13, 14 or 15.

Figure 3:
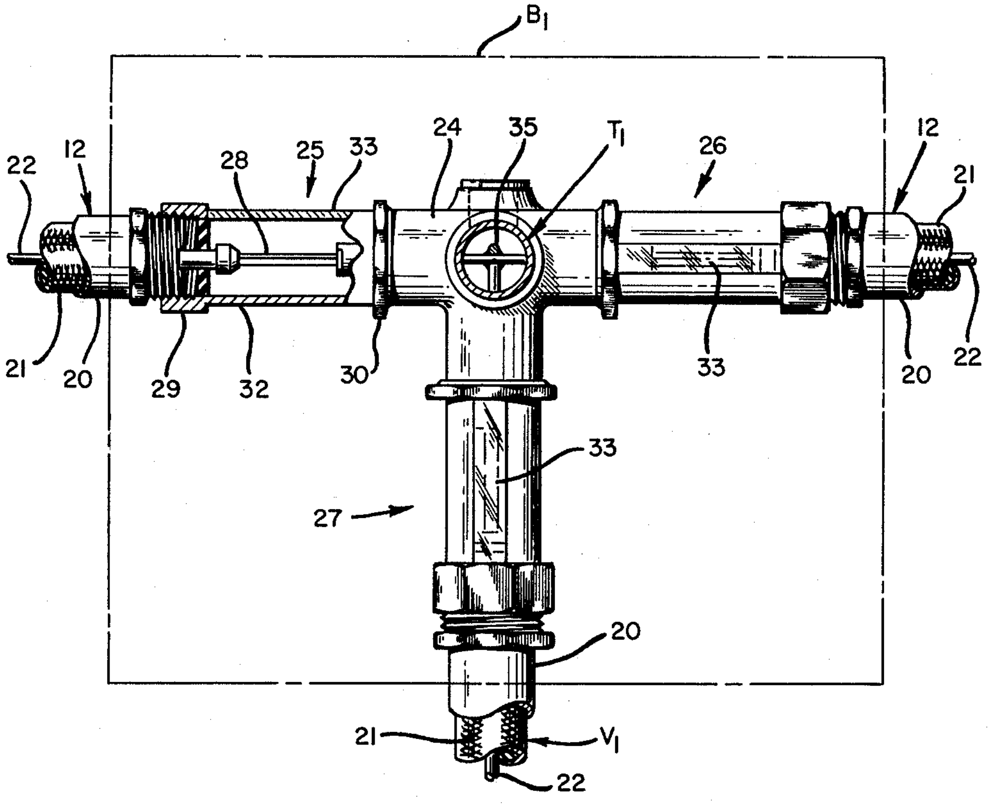
FIGURE 3 is a detailed plan view of one of the cable junctions.

The T junction blocks are substantially identical in construction, and it will therefore be sufficient to describe block $B_1$ shown in FIGURE 3. Coaxial cables 12 and $V_1$ comprise an outer covering of insulating material 20, an outer conductor 21 and an inner conductor 22. Each of these coaxial lines is joined together by a T fitting 24 by line disconnect assemblies 25, 26 and 27 (the disconnect assembly for cable $T_1$ not being shown). These disconnect assemblies are responsive to excessive voltages or currents that may result from damaged cables and may be the circuit breaker or fuse type, the latter being shown and described herein by way of example.

Each disconnect assembly comprises an inner conducting link 28 (see assembly 25) of fusable metal joined at its ends through connectors 29 and 30 to the inner conductors 22 of the coaxial lines. The outer sleeve 32 of the assembly is a metallic conductor providing an electrical connection between outer conductors 20 of the cables and of the housing of the T fitting 24. In order to permit visual inspection of the condition of fusable link 28 of each of the fuse assemblies, the outer shield 32 thereof is formed with a window 33.

Inner conductors 22 of the coaxial cables are joined within the T fitting 24 as indicated at 35.

Each of the coaxial lines transmits radio frequency energy in the usual manner to remote points and over a broad range of frequencies characteristic of these lines. The T junctions are constructed to be essentially lossless and provide for distribution of the radio frequency energy transversely and vertically as well as longitudinally of the ship. In event of a shipboard catastrophe such as a fire, explosion, collision or the like, one or more of the longitudinal and/or transverse lines may be severed or damaged to an extent to seriously interfere with radio frequency transmission. If a section of any of the cables is totally destroyed, this condition will be self-evident and will itself serve as a means of identifying and locating the damage. If the cable is crushed or shorted internally, such condition would not be readily apparent and would entail difficulty and delay in locating and repairing the damage. In accordance with this invention, such internal cable damage is located in the following manner.

Figure 4:
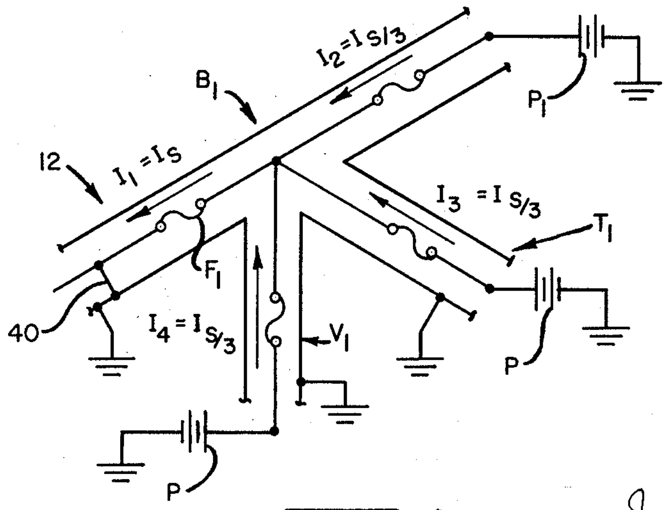
FIGURE 4 is a schematic diagram of the fused coaxial T junctions of the network.

The inner conductors of the various cables are energized by a suitable bias supply, shown as power sources P in FIGURE 4, and the outer conductors are grounded. This bias power is isolated from the networks of stations S by appropriate isolation blocks. Assume that a short exists between the inner and outer conductors as indicated schematically by the jumper lead 40 in FIGURE 4. This means that transmission through the damaged section of cable 12 would be distorted. However the current from the three undamaged sections of the cable at the adjacent T junction $B_1$ add to provide a total current through the fuse $F_1$ in the damaged leg to cause that fuse to open and indicate the leg which is damaged. The current in the damaged leg is indicated by the arrow as $I_1$ and the currents in the other three legs $I_2$, $I_3$ and $I_4$ are indicated as being equal to one-third of the total current $I_s$. This opened fuse $F_1$ is readily apparent through the window 33 of the fuse assembly and so that rapid location and repair of damaged lines is possible.

If circuit breakers are used, the conventional flags or drop arms used with such disconnects serve to give visual indication of the open breaker.

If one or more but less than all of the cables at any location throughout the length of the ship are damaged or even broken, communication between remote stations may be carried on through the interconnection of longitudinal lines by the transverse lines. In this manner, the danger of a total loss of communications is minimized and the security of communications control is greatly enhanced.

Changes, modifications and improvements to the above described preferred embodiment of our invention may be made by those skilled in the art without departing from the precepts and scope of the invention. The novel features of the invention are defined in the appended claims.

What is claimed is:

1. A communications system comprising a plurality of spaced terminal stations for transmitting and receiving data at data-transmitting frequencies, a longitudinally and transversely connected network of conductors providing a plurality of transmission paths between the stations, disconnects adjacent the junctures of the network in the portions of the network between the junctures responsive to a direct current for disconnecting the portions of the network in which the disconnects are located in the event that a fault occurs therein, and means for supplying the network with said direct current.

2. A communications system comprising a plurality of spaced terminal stations for transmitting and reeiving the data-transmitting frequency, a network providing a plurality of joined transmission paths in parallel with each other between each pair of terminal stations, disconnects in each parallel path adjacent the junctures thereof with other paths in relation to which they are parallel responsive to direct electric current to disconnect the portion of the path in which the disconnect is located from other paths in the event that a fault develops in said portion, and means for supplying the network with direct electric current.

References Cited in the file of this patent

UNITED STATES PATENTS

| | | |
|---|---|---|
| 1,593,369 | Stone | July 20, 1926 |
| 1,835,031 | Espenschied | Dec. 8, 1931 |
| 1,947,100 | Parsons | Feb. 13, 1934 |
| 1,969,301 | Edwards | Aug. 7, 1934 |
| 2,365,514 | Bosch | Dec. 19, 1944 |
| 2,393,021 | Cheek | Jan. 15, 1946 |
| 2,587,676 | Akers | Mar. 4, 1952 |
| 2,942,193 | Tryon | June 21, 1960 |
| 2,968,696 | Trousdale | Jan. 17, 1961 |

OTHER REFERENCES

Electrical Engineers Handbook (Electric Power), by Pender and Del Mar, fourth edition, Wiley, 1949, page 14–147 (one page) cited.